United States Patent
Tin (10) Patent No.: US 7,692,663 B2
(45) Date of Patent: Apr. 6, 2010

(54) MULTI-SHELLED GAMUT BOUNDARY DESCRIPTOR FOR AN RGB PROJECTOR

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 11/252,563

(22) Filed: Oct. 19, 2005

(65) Prior Publication Data

US 2007/0086027 A1  Apr. 19, 2007

(51) Int. Cl.
*G09G 5/02* (2006.01)
*G03F 3/08* (2006.01)
*G06K 9/00* (2006.01)
*H04N 1/46* (2006.01)

(52) U.S. Cl. ............. 345/591; 345/590; 345/604; 358/518; 358/520; 358/525; 382/162; 382/167

(58) Field of Classification Search ............ 345/590, 345/604; 358/518, 520, 525; 382/162, 167
See application file for complete search history.

(56) References Cited

U.S. PATENT DOCUMENTS

| | | | | |
|---|---|---|---|---|
| 5,721,572 A * | 2/1998 | Wan et al. | ............. | 345/590 |
| 2004/0100643 A1 | 5/2004 | Jones et al. | ............. | 358/1.9 |
| 2005/0030560 A1 | 2/2005 | Maltz et al. | ............. | 358/1.9 |
| 2005/0047648 A1 | 3/2005 | Newman et al. | ............. | 386/162 |
| 2005/0047654 A1 | 3/2005 | Newman et al. | ............. | 382/167 |
| 2005/0140612 A1 * | 6/2005 | Baek | ............. | 345/83 |
| 2007/0052986 A1 * | 3/2007 | Spaulding et al. | ............. | 358/1.9 |

OTHER PUBLICATIONS

Wyble, et al., "Colorimetric Characterization Model for DLP™ Projectors", Proceedings of IS&T/SID Eleventh Color Imaging Conference.
Wyble, et al., "Color Management of DLP Projectors", Proceedings of IS&T/SID Twelfth Color Imaging Conference.
Wang, et al., "Determination of CRT Color Gamut Boundaries in Perceptual Color Space", <www.paper.edu.cn>.

* cited by examiner

*Primary Examiner*—Xiao M Wu
*Assistant Examiner*—Tize Ma
(74) *Attorney, Agent, or Firm*—Fitzpatrick, Cella, Harper & Scinto (57) ABSTRACT

Construction and use of a multi-shelled gamut boundary descriptor for an RGB display device in which one shell is an outer "plausible" shell and another shell is an inner "reference" shell. The outer shell is coterminous with a unit RGB cube. The inner shell is constructed based on eight reference primaries in the RGB cube, corresponding to primary colors black, blue, green, cyan. red, magenta, yellow and white. Both the inner cube and the outer cube in RGB color space are transformed to a perceptual color space, thereby defining the GBDs for an inner and an outer shell of a multi-shelled GBD.

17 Claims, 5 Drawing Sheets

MULTI-SHELLED GAMUT BOUNDARY DESCRIPTOR FOR AN RGB PROJECTOR

BACKGROUND OF THE INVENTION

1. Field of the Invention

The present invention concerns construction and use of a multi-shelled gamut-boundary descriptor for an RGB projector such as a DLP™ digital projector and other display devices, and is particularly useful in a situation where gamut mapping is required for high dynamic range (HDR) imagery and HDR devices.

2. Description of the Related Art

The need for gamut mapping arises during reproduction of colors rendered on one device and/or medium onto another device and/or medium. The difference in gamuts between these devices and media requires re-mapping of colors such that colors in the source gamut are mapped to colors within the destination gamut. In gamut-mapping where HDR imagery and HDR devices are involved, it has been found that a gamut mapping algorithm (GMA) that employs a multi-shelled gamut boundary descriptor (GBD) often yields improved gamut-mapped results and increased color fidelity. See U.S. Patent Application Publication 2005/0047648, "Color Descriptor Data Structure" by Newman, et al., and U.S. Patent Application Publication 2005/0047654 "Gamut Mapping Between Multiple Boundary Regions" by Newman, et al. These published applications are incorporated herein by reference.

SUMMARY OF THE INVENTION

One type of HDR device is an RGB projector such as a DLP™ digital projector. It is an object of the invention to develop a multi-shelled GBD for such an RGB projector, and to use the multi-shelled GBD in connection with GMAs and color management modules that rely on such multi-shelled GBDs. More generally, however, it is an object of the invention to develop and to use multi-shelled GBDs for any self-luminous device, and particularly self-luminous devices where the additive white of the device differs significantly from the actual device white.

According to the invention, a two-shelled GBD is constructed in which one shell is an outer "plausible" shell and the other shell is an inner "reference" shell. In the RGB color space that defines the device dependent color coordinate system of the source device, the outer shell is conterminous with a unit RGB cube. The inner shell is constructed based on eight reference primaries in the RGB cube, corresponding to primary colors black, blue, green, cyan, red, magenta, yellow and white, and resulting in an irregularly-shaped cube in the RGB color coordinate system.

Most GMAs are performed in a perceptual color space, and color management modules therefore accept as input the gamut boundary descriptor in a perceptual color space. To transform the inner and the outer shells from RGB space to a perceptual color space, reference is made to a device model for the device which defines a relationship between color values in the device dependent RGB color coordinate system and corresponding color values in a device independent color coordinate system, such as XYZ tristimulus coordinates. The device model is applied to both the outer "plausible" shell in RGB space and the inner "reference" shell in RGB space, thereby resulting in corresponding outer and inner shells in a device independent space (here, an XYZ tristimulus color coordinate system). These shells are thereafter transformed into a perceptual color space, such as a Jab CAM color space through application of an XYZ-to-CAM transformation.

The invention is also directed to preferred techniques for deriving the reference primaries by which the irregularly-shaped cube for the inner "reference" shell is constructed. Preferably, the reference primaries are based on an "additive white value" which is defined herein. The concept of an "additive white value" recognizes that HDR display devices such as RGB projectors often boost white output of the device such that actual white of the device is significantly brighter than a white value that might be expected from the color addition of a full-on red output plus a full-on green output plus a full-on blue output. Such devices are sometimes referred to as "RGBW" devices. Thus, "additive white" is a somewhat darker white value than actual device white, and contributes to the effectiveness of HDR imagery by preserving the difference between a bright white and even whiter whites such as specular whites.

In preferred embodiments of the invention, the white reference primary for the inner shell corresponds to the additive white or corresponds to an average of the r, g and b components of the additive white value. In other embodiments, all eight reference primaries are based on various combinations of the r, g and b components of additive white, or an average of those values. A scaling factor can be applied to any or all of these values, so as to control a separation between the outer "plausible" shell and the inner "reference" shell. In addition, the HDR device might provide for a "shadow black" which represents a difference between a black output dark enough to render shadows in natural scenes and the darkest output of an HDR image. In such cases, preferred embodiments of the invention define reference values for the inner shell also in dependence on the shadow black.

The invention also contemplates usage of multi-shelled gamut boundary descriptors constructed according to the invention, and in particular the invention contemplates usage of these GBDs in a color management module or other color transformations from a source device to a destination device in which one or both of the source and destination devices is an RGB projector.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
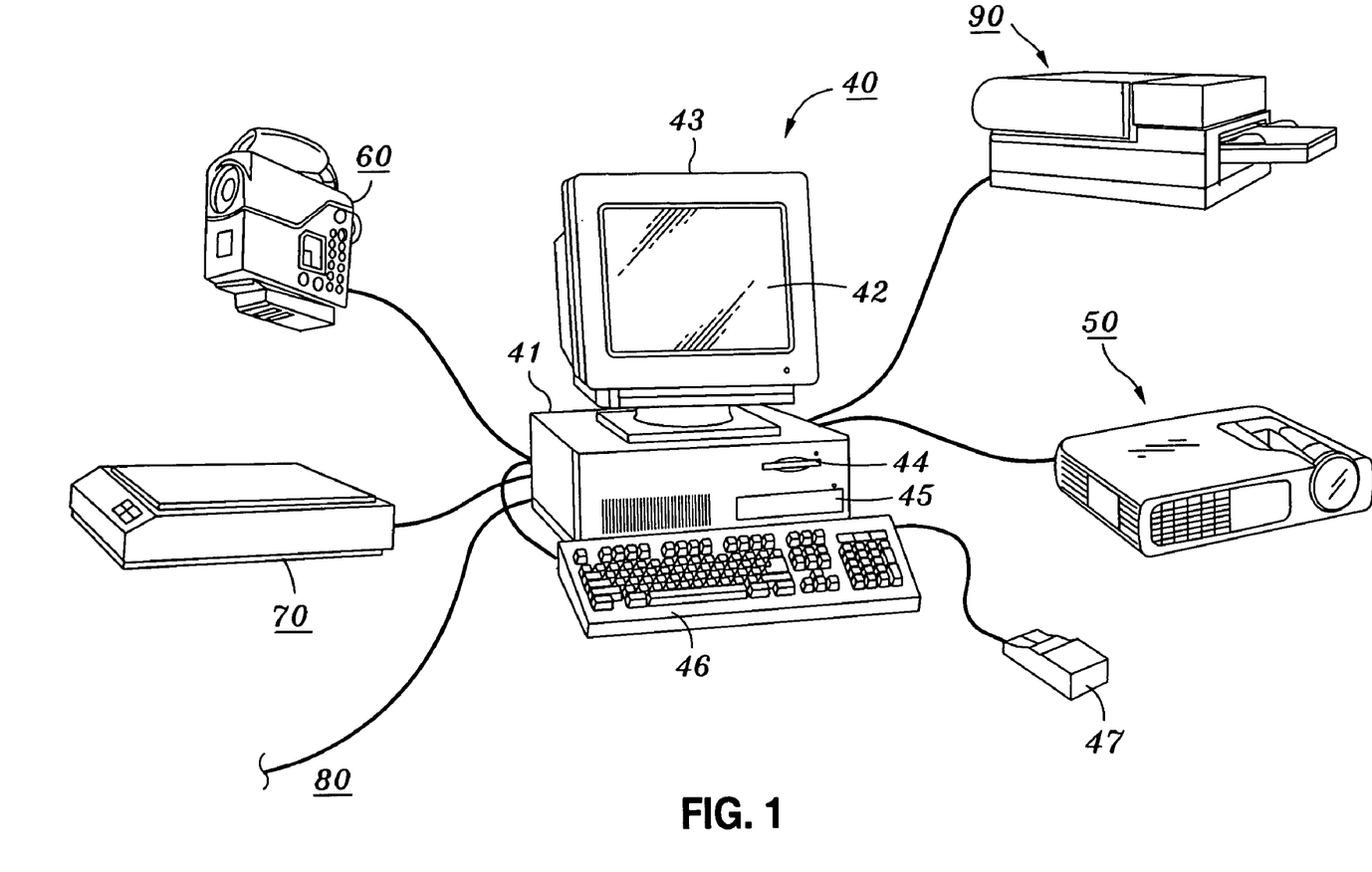
FIG. 1 is a representative view of a computing environment in which the present invention may be implemented according to one embodiment of the invention.

FIG. 1 shows a computing environment in which the present invention may be implemented. FIG. 1 depicts a representative computing system including computing equipment, peripherals and digital devices which may be used in connection with the practice of the present invention. Computing equipment 40 includes host 41 which generally comprises a personal computer (hereinafter "PC") having an operating system such as Microsoft® Windows® or Apple® Mac OS® or LINUX. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Computing equipment 40 also includes computer-readable memory media such as computer fixed disk 45 and floppy disk drive 44. Floppy disk drive 44 provides a means whereby computing equipment 40 can access information, such as image data, computer-executable process steps, application programs, etc. stored on removable memory media. In an alternative, information can also be retrieved through other computer-readable media such as a USB storage device connected to a USB port (not shown), or through network interface 80. Also, a CD-ROM drive and/or a DVD drive (not shown) may be included so that computing equipment 40 can access information stored on removable CD-ROM and DVD media.

Projector 50 is an RGB or RGBW projector, such as a DLP™ digital projector or other display device that preferably is an HDR device capable of projecting HDR images. Projector 50 projects images onto a display screen (unshown) by using additive light combinations of red (R), green (G) and blue (B) lights. In addition, and particularly in a case of an HDR device, projector 50 also uses a white (W) light so as to increase the brightness/luminance of projected images and thereby project HDR images with good fidelity over a large dynamic range.

Printer 90 is a color laser printer or other color output device, and is an example of a color output device which forms color images on a recording medium such as paper or transparencies or the like. Preferably, printer 90 forms color images using cyan, magenta, yellow and black inks, although the present invention can be used with printers and devices which use other colorant combinations that include black.

Digital color scanner 70 is a first example of a color input device, and is provided for scanning documents and images and sending the corresponding image data to computing equipment 40. Digital color camera 60 a second example of a color input device, and is provided for sending digital image data to computing equipment 40. Of course, computing equipment 40 may acquire digital image data from other sources such as a digital video camera, a local area network or the Internet via network interface 80.

Figure 2:
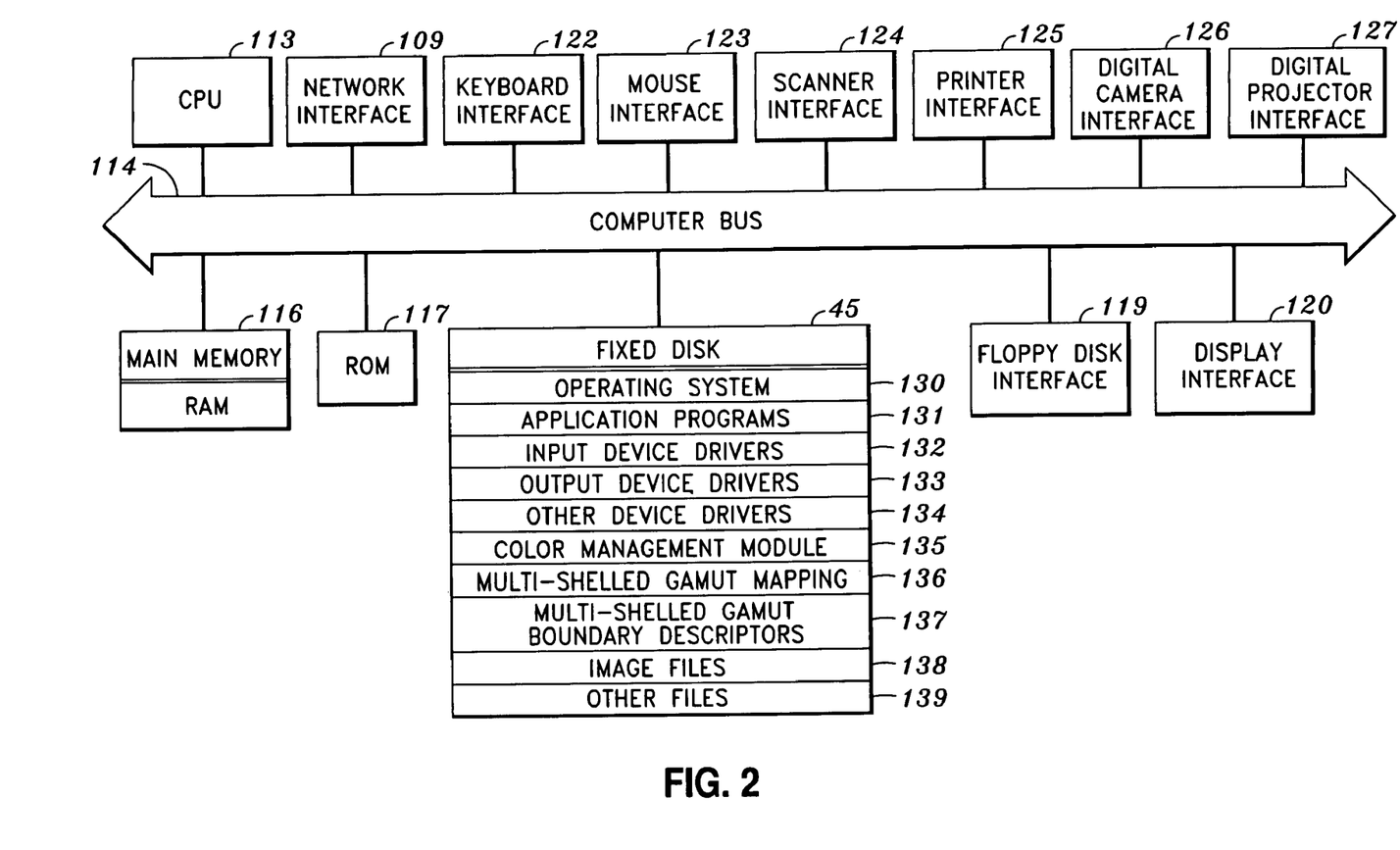
FIG. 2 is a detailed block diagram depicting the internal architecture of the computing device shown in FIG. 1 according to one embodiment of the invention.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printer 90, digital camera interface 126 for digital camera 60, and digital projector interface 127 for digital projector 50.

RAM 116 interfaces with computer bus 114 so as to provide information stored in RAM 116 to CPU 113 during execution of software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable process steps need to access and/or modify the data.

As also shown in FIG. 2, fixed disk 45 contains operating system 130, application programs 131, such as word processing programs or a graphic image management programs. Fixed disk 45 also contains device drivers for software interface to devices, such as input device drivers 132, output device drivers 133, and other device drivers 134. Image files 138, including color image files, and other files 139 are available for output to color output devices and for manipulation by application programs.

Color management module (CMM) 135 manages colors during transport of an image from a source device to a destination device, such as from capture by digital camera 60 to display by projector 50. CMM 135 generally comprises process steps that accept a source image in a source device dependent color system and generate a destination image in a destination device dependent color system. Using color profiles or other color characterizations of the source and destination device, CMM 135 will generally transform the source image to a device independent color system, possibly to a perceptual color system for better interpretation of rendering intent and better preservation of color fidelity, apply a gamut mapping from source to destination and then transform the gamut-mapped image to the destination device dependent color system. CMM 135 may be configured as a part of operating system 130, as part of an output device driver such as a printer driver, or as a stand-alone application program; it may also be configured as a plug-in or dynamic link library (DLL) to the operating system, device driver or application program.

In use of CMM 135, projector 50 can operate either as a source device or as a destination device. One example of projector 50 operating as a source device is in a situation where it is desired to print an image on printer 90 in correspondence to an image being projected by projector 50. One example of projector 50 operating as a destination device was given above, where it is desired to project an image corresponding to an image captured by digital camera 60. Other examples are situations where it is desired to project an image in correspondence to an image scanned by scanner 70, or displayed by display screen 42. Other combinations and permutations are possible and will be evident to those of ordinary skill in the art.

One gamut mapping available to CMM 135 is a multi-shelled gamut mapping 136. During gamut mapping, gamut mapping 136 accesses multi-shelled gamut boundary descriptors (GBDs) 137. Construction of a multi-shelled GBD 137 for projector 50 is discussed in more detail below.

"Shells" arise in various contexts in GBD modeling of devices. In the two aforementioned published applications by Newman, et al., it was proposed that the GBD should consist of several gamut shells. In respect of this additional shell structure, gamut mapping 136 is designed to map one shell in the source GBD to a corresponding shell in the destination GBD.

The benefit of multi-shelled gamut mapping 136 is particularly evident in the case of RGB projectors, and particularly for HDR RGB projectors, for the reason that these display devices ordinarily deviate from well-established models for modeling their color output characteristics. In more detail, many non-LCD based projectors deviate from the theoretical matrix/TRC model. For example, Wyble, et al., "Colorimetric Characterization Model for DLP™ Projectors", Proceedings of IS&T/SID Eleventh Color Imaging Conference and Wyble, et al., "Color Management of DLP Projectors", Proceedings of IS&T/SID Twelfth Color Imaging Conference have proposed an analytical model more complicated than the matrix/TRC model. In particular, sum of black-corrected, full-on red, green and blue is in general not equal to the black-corrected white. The following table illustrates this.

|  | X (cd/m$^2$) | Y (cd/m$^2$) | Z (cd/m$^2$) |
| --- | --- | --- | --- |
| Red (r) | 26.887 | 15.328 | 1.158 |
| Green (g) | 65.239 | 106.754 | 23.743 |
| Blue (b) | 25.013 | 10.823 | 131.699 |
| Black (k) | 0.284 | 0.312 | 0.263 |
| White (w) | 236.294 | 260.102 | 313.386 |
| Black-corrected Red (r' = r − k) | 26.603 | 15.016 | 0.895 |
| Black-corrected Green (g' = g − k) | 64.955 | 106.442 | 23.48 |
| Black-corrected Blue (b' = b − k) | 24.729 | 10.511 | 131.436 |
| Black-corrected White (w' = w − k) | 236.01 | 259.79 | 313.123 |
| Black-corrected Additive White (r' + g' + b') | 116.287 | 131.969 | 155.811 |

If the matrix/TRC model were to hold true, then the "black-corrected white" should be the same (up to measurement errors) as the "black-corrected additive white", which is the sum of black-corrected full-on primaries. It is evident that these values differ significantly from each other.

In the context of the invention, "additive white" is a darker white point, thus setting a perimeter for an inner shell. On the other hand, just one point is not enough to specify a whole shell, a 2-D curved surface which we represent as a triangle mesh.

In the following, a construction technique is described that works for a given set of "reference primaries" in the RGB device space.

A first embodiment of the invention will be described, for construction of a multi-shelled GBD for display devices such as projector 50.

The "additive white" described above is one of "reference primaries" in this terminology. However, it is preferable to make the specification in the device RGB space, the reason of which will be explained momentarily. To set notation, inside the RGB cube $0 \leq r \leq 1$, $0 \leq g \leq 1$, $0 \leq b \leq 1$, it is assumed that eight points have been chosen and designated as follows.

| Reference Black: | r = r000, g = g000, b = b000 |
| --- | --- |
| Reference Blue: | r = r001, g = g001, b = b001 |
| Reference Green: | r = r010, g = g010, b = b010 |
| Reference Cyan: | r = r011, g = g011, b = b011 |
| Reference Red: | r = r100, g = g100, b = b100 |
| Reference Magenta: | r = r101, g = g101, b = b101 |

-continued

| Reference Yellow: | r = r110, g = g110, b = b110 |
| --- | --- |
| Reference White: | r = r111, g = g111, b = b111 |

Figure 3:
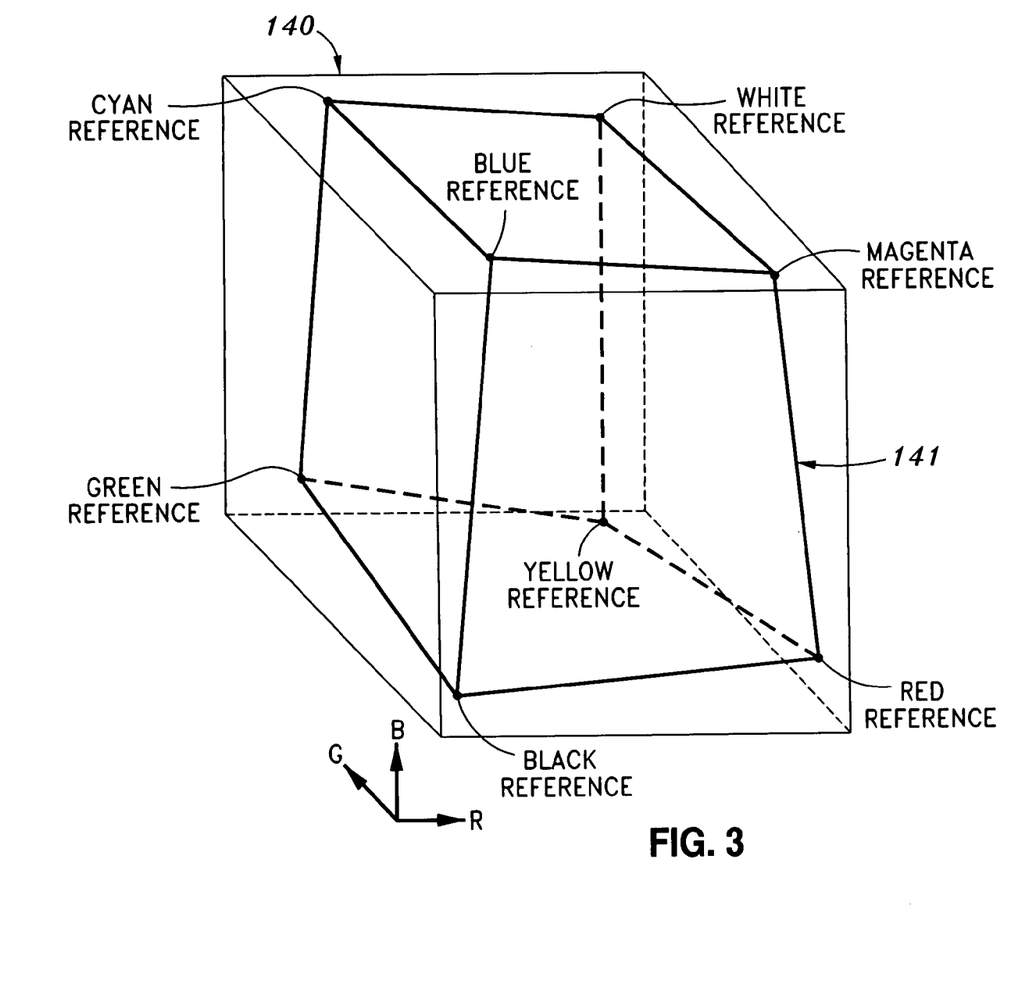
FIG. 3 is a view for explaining construction of an outer unit cube and an inner irregularly-shaped cube according to a first embodiment of the invention.

These eight points define an irregularly-shaped inner cube 141 corresponding to an inner shell ("reference shell") as depicted in FIG. 3 relative to an outer shell corresponding to a unit cube 140. Note that this shell may be different from the convex hull of the eight points in the RGB space. In other words, this inner gamut is constructed by connecting the points as specified in the corner assignments above. The convex hull of these eight points in RGB space will contain the inner gamut, and will usually be the same as the inner gamut, but it does not have to be. The reason why the inner gamut is constructed in the RGB device space is because it is guaranteed to lie inside the RGB unit cube, which will become the outer shell ("plausible shell"). The convexity of the RGB cube makes sure that constructions such as connecting two points will not venture outside the RGB cube. A similar statement cannot be made if the constructions occur after transformation of the RGB's into a color appearance space such as CAM02 Jab space, because in general the outer shell in that space will not be convex.

The 2D boundary of this inner gamut in a color appearance space is the inner "reference" shell for which construction according to the invention is desired. The actual implementation involves two steps: STEP 1—Construct a device that has this inner gamut as its (full) gamut; and STEP 2—Construct the gamut boundary (such as a triangle mesh) of this device.

Figure 4:
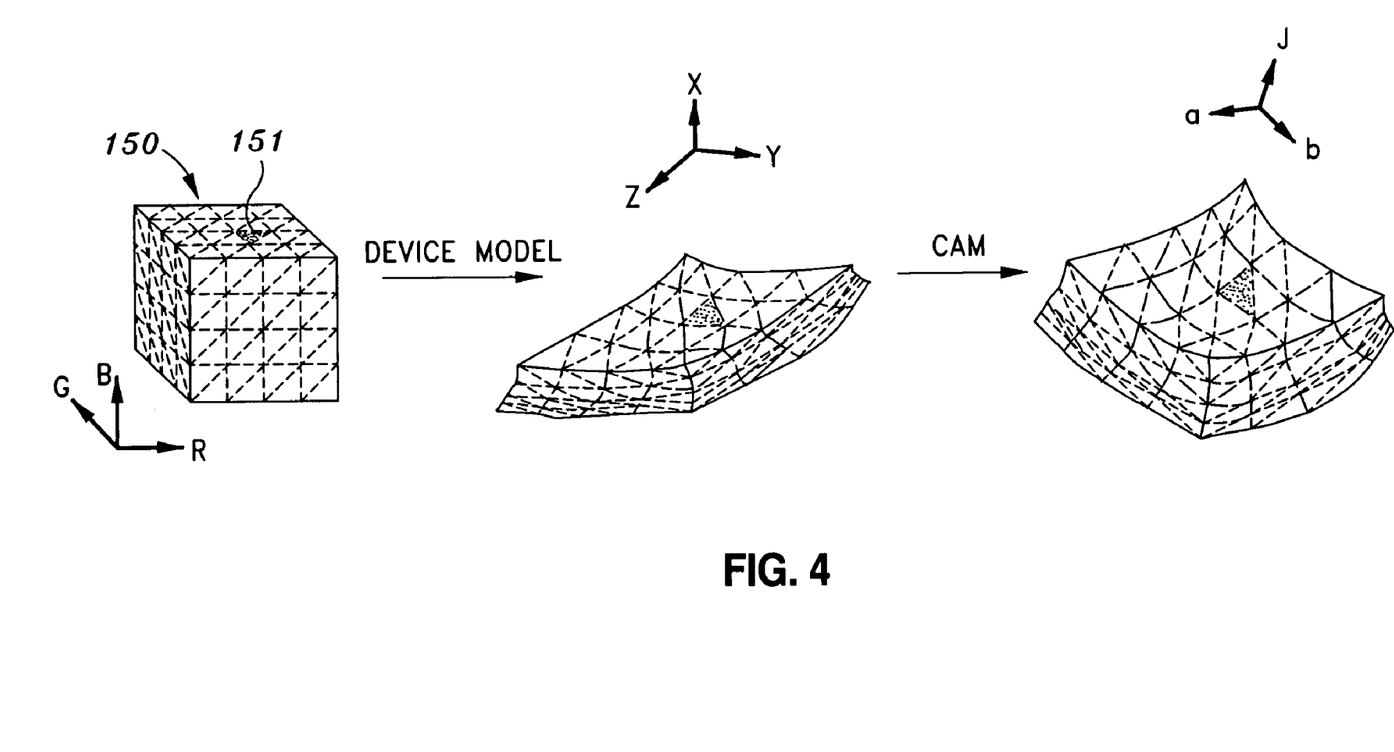
FIG. 4 shows transformation of an outer unit cube from an RGB color coordinate system to a perceptual color coordinate system.

Any technique can be used for STEP 2, and the invention is not predicated on any particular technique in the context of the present invention. As an example, however, one such technique is to introduce a triangle mesh on the boundary faces of the RGB unit cube 150. See FIG. 4, in which one triangle 151 is highlighted in its stages of transformation. Each face of the RGB cube is triangulated in some manner, then the triangulation is transferred to a CAM space by first applying the device model (which takes RGB to XYZ) followed by the CAM transformation (which takes XYZ to Jab).

STEP 1 is achieved by placing an "adaptor" before the device at hand. It is assumed that a device model (DM) has already been derived for the device in question. In other words, if the procedure in STEP 2 is applied to this DM directly, the outer "plausible" shell is obtained. To obtain the inner "reference" shell, the input RGB's are restricted so that the gamut is restricted to the inner shell, and that is achieved by the adaptor. The adaptor may be a shear transformation of the RGB cube. More precisely, it is a transformation from RGB to RGB that transforms the unit cube to the irregularly-shaped inner cube and that satisfies the boundary conditions:

(0,0,0)→(r000, g000, b000)
(0,0,1)→(r001, g001, b001)
(0,1,0)→(r010, g010, b010)
(0,1,1)→(r011, g011, b011)
(1,0,0)→(r100, g100, b100)
(1,0,1)→(r101, g101, b101)
(1,1,0)→(r110, g110, b110)
(1,1,1)→(r111, g111, b111)

This is of course the problem of interpolating on the eight corners of the unit cube. A transformation that solves this problem is an interpolant. Again, the invention is not predicated on any particular interpolation algorithm, but as one example the well-known tetrahedral interpolation algorithm will provide the needed transformation. If this transformation is called S (for shear), then a modified device model (DM') that has the inner shell as the gamut boundary is obtained by:

$$DM': RGB \xrightarrow{S} RGB \xrightarrow{DM} XYZ$$

This completes the description of STEP 1. Applying DM' with STEP 2 will produce the inner reference shell in perceptual color space.

A second embodiment of the invention will now be described, with particular focus on how to supply the eight reference primaries that define the irregularly-shaped inner cube. In the case of projectors with enhanced white point, such as a DLP™ projector, the following has been found to be successful. The idea is to derive a reference white based on the "additive white", and deduce other reference primaries in some reasonable manner.

It is assumed that the device model DM has already been built. In addition, the model has been inverted to $DM^{-1}$. The XYZ of the additive white is then given by $$X_{aw} = X_r + X_g + X_b - 2X_k$$

$$Y_{aw} = Y_r + Y_g + Y_b - 2Y_k$$

$$Z_{aw} = Z_r + Z_g + Z_b - 2Z_k$$

where the subscripts "aw", "r", "g", "b", "k" stand for "additive white", "red", "green", "blue" and "black" respectively. The inverse model $DM^{-1}$ is applied so as to obtain the corresponding RGB device value that would give the additive white.

$$(r_{aw}, g_{aw}, b_{aw}) = DM^{-1}(X_{aw}, Y_{aw}, Z_{aw})$$

In this second embodiment of the invention, the values for $r_{aw}$, $g_{aw}$, $b_{aw}$ are not used directly as the reference white. Instead, they are averaged:

$$t = \frac{r_{aw} + g_{aw} + b_{aw}}{3}$$

This level is also applied to other primaries. In summary, the reference primaries are:

| Reference Black:   | r = 0, g = 0, b = 0 |
|---|---|
| Reference Blue:    | r = 0, g = 0, b = t |
| Reference Green:   | r = 0, g = t, b = 0 |
| Reference Cyan:    | r = 0, g = t, b = t |
| Reference Red:     | r = t, g = 0, b = 0 |
| Reference Magenta: | r = t, g = 0, b = t |
| Reference Yellow:  | r = t, g = t, b = 0 |
| Reference White:   | r = t, g = t, b = t |

This choice of reference primaries produces a reference shell that has a white point approximately on the same luminance level as the additive white, and also has all chromatic colors scaled back from the plausible shell. This is believed to be beneficial in certain GMA such as SGCK in terms of smoother chroma compression. In this embodiment, the configuration of the inner cube 153 relative to the outer unit cube 152 is depicted in FIG. 5.

Figure 5:
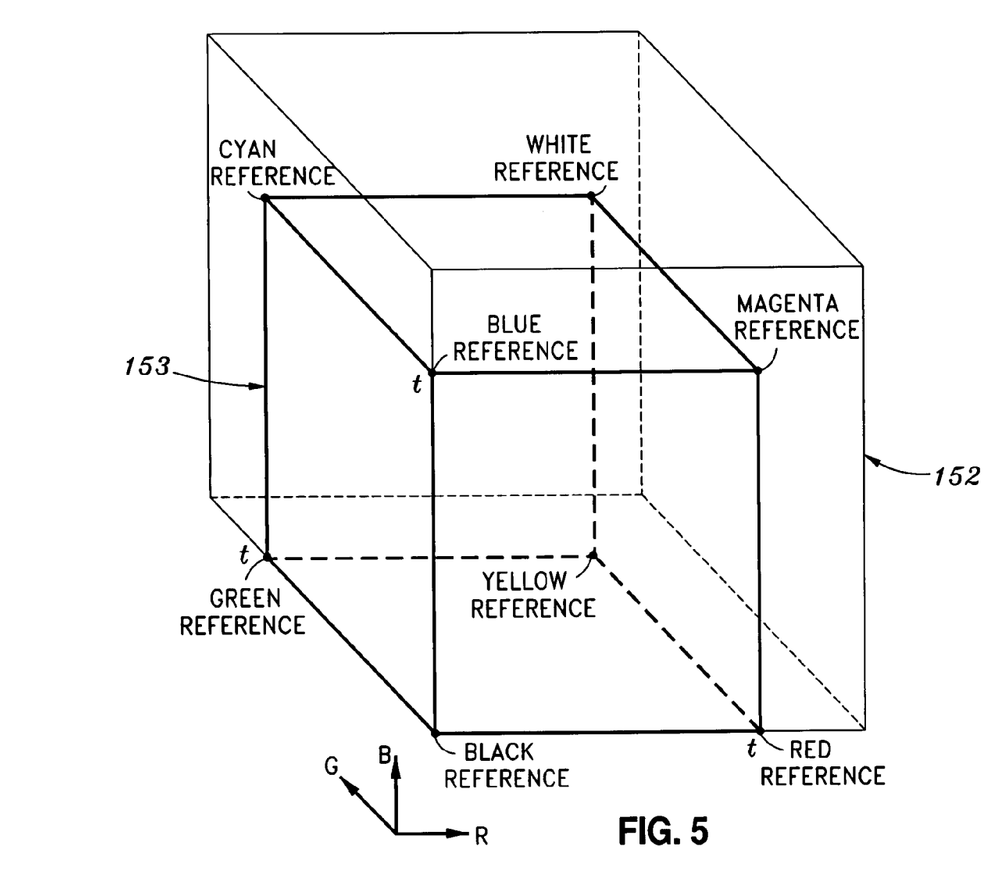
FIG. 5 is a view for explaining construction of an outer unit cube and an inner irregularly-shaped cube according to a second embodiment of the invention.

The irregularly-shaped inner cube 153 of FIG. 5 is then transformed as in the first embodiment, by applying an interpolant (from RGB to RGB) that transforms a unit cube into the irregularly-shaped cube, applying the device model (from RGB to device independent space such as CIEXYZ space), and applying a transformation (such as a CAM transform) that transforms from the device independent space into a perceptual color space such as Jab. The resulting surface is an inner "reference" shell for a multi-shelled GBD of projector 50.

Other embodiments of the invention provide for alternative selection of the reference primaries, and highlight the flexibility of the general technique for specifying the reference shell, which was illustrated by the first embodiment. The following are alternative choices of the reference primaries:

1. Adjust only the additive white, keeping the other primaries fixed.

| Reference Black:   | r = 0, g = 0, b = 0 |
|---|---|
| Reference Blue:    | r = 0, g = 0, b = 1 |
| Reference Green:   | r = 0, g = 1, b = 0 |
| Reference Cyan:    | r = 0, g = 1 b = 1 |
| Reference Red:     | r = 1, g = 0, b = 0 |
| Reference Magenta: | r = 1, g = 0, b = 1 |
| Reference Yellow:  | r = 1, g = 1, b = 0 |
| Reference White:   | r = t, g = t, b = t |

In the same vein, the actual additive white can be used instead of the averaged one.

| Reference Black:   | r = 0, g = 0, b = 0 |
|---|---|
| Reference Blue:    | r = 0, g = 0, b = 1 |
| Reference Green:   | r = 0, g = 1, b = 0 |
| Reference Cyan:    | r = 0, g = 1 b = 1 |
| Reference Red:     | r = 1, g = 0, b = 0 |
| Reference Magenta: | r = 1, g = 0, b = 1 |
| Reference Yellow:  | r = 1, g = 1, b = 0 |
| Reference White:   | r = $r_{aw}$, g = $g_{aw}$, b = $b_{aw}$ |

2. Apply different scalings in different directions. For example, if a "fudge factor" s (between 0 and 1/t) is introduced, then

| Reference Black:   | r = 0, g = 0, b = 0 |
|---|---|
| Reference Blue:    | r = 0, g = 0, b = s*t |
| Reference Green:   | r = 0, g = s*t, b = 0 |
| Reference Cyan:    | r = 0, g = s*t, b = s*t |
| Reference Red:     | r = s*t, g = 0, b = 0 |
| Reference Magenta: | r = s*t, g = 0, b = s*t |
| Reference Yellow:  | r = s*t, g = s*t, b = 0 |
| Reference White:   | r = t, g = t, b = t |

This allows tuning of the "separation" between the reference shell and plausible shell in the chromatic colors.

3. An HDR device may have a "shadow black". In the following example, (k,k,k) is chosen with the assumption that it is dark enough to render shadows in "normal" scenes, reserving (0,0,0) for the darkest spot in HDR images.

| Reference Black:   | r = k, g = k, b = k |
|---|---|
| Reference Blue:    | r = 0, g = 0, b = t |
| Reference Green:   | r = 0, g = t, b = 0 |
| Reference Cyan:    | r = 0, g = t, b = t |
| Reference Red:     | r = t, g = 0, b = 0 |
| Reference Magenta: | r = t, g = 0, b = t |
| Reference Yellow:  | r = t, g = t, b = 0 |
| Reference White:   | r = t, g = t, b = t |

A combination of these techniques can also be used.

Although the invention has been described with particular illustrative embodiments, the invention is not limited to the above-described embodiments and various changes and modification may be made by those of ordinary skill in the art without departing from the spirit and scope of the invention.

What is claimed is:

1. Method in a computer for constructing a multi-shelled gamut boundary descriptor (GBD) for an RGBW self-luminous display device which projects a white light W brighter than additive RGB white, wherein there is a device model for the self-luminous display device which defines a relationship between color values in a device dependent RGB color coordinate system and corresponding color values in a device independent color coordinate system, and wherein the multi-shelled GBD comprises at least an outer shell and an inner shell, said method comprising:

using the computer to construct the outer shell of the multi-shelled GBD by transforming a unit cube in the RGB color coordinate system into a perceptual color space, and using the computer to construct the inner shell of the multi-shelled GBD by transforming an irregularly-shaped inner cube in the RGB color coordinate system into the perceptual color space, wherein the irregularly-shaped inner cube in the RGB color coordinate system is defined by eight reference primaries that define vertices of the irregularly-shaped cube, and wherein one of the vertices of the irregularly-shaped inner cube from which the inner shell of the multi-shelled GBD is constructed corresponds to the additive RGB white.

2. A method according to claim 1, wherein said step of transforming the unit cube comprises application of the device model to the unit cube in the RGB color co-ordinate system and application of a transformation from the device independent coordinate system to the perceptual color coordinate system.

3. A method according to claim 1, wherein said step of transforming the irregularly-shaped inner cube comprises application of an interpolant that transforms a unit cube to the irregularly-shaped cube, application of the device model, and application of the transformation from the device independent coordinate system to the perceptual coordinate system.

4. A method according to claim 1, wherein the additive RGB white value preserves a distinction between a bright white output of the device and a specular white output of the device.

5. A method according to claim 4, wherein RGB color values for the additive RGB white value are calculated by measuring device output in the device independent color space for each of three independent full-on outputs of red, green and blue, measuring device output in the device independent coordinate space for a black output, calculating an additive XYZ white value in the device independent coordinate space by applying the following equations:

$X_{aw} = X_r + X_g + X_b - 2X_k$ $Y_{aw} = Y_r + Y_g + Y_b - 2Y_k$ $Z_{aw} = Z_r + Z_g + Z_b - 2Z_k$ and transforming the additive XYZ white value to the RGB color space by applying an inverse of the device model.

6. A method according to claim 5, wherein some or all of the reference primaries are based on the additive RGB white value.

7. A method according to claim 5, wherein some or all of the reference primaries are based on an average of the RGB color values of the additive RGB white value.

8. An apparatus for constructing a multi-shelled gamut boundary descriptor (GBD) for an RGBW self-luminous display device which projects a white light W brighter than additive RGB white, wherein there is a device model for the self-luminous display device which defines a relationship between color values in a device dependent RGB color coordinate system and corresponding color values in a device independent color coordinate system, and wherein the multi-shelled GBD comprises at least an outer shell and an inner shell, said apparatus comprising:

memory for storing computer-executable process steps, and a processor for executing the process steps stored in memory, wherein the process steps comprise:

a first constructing step for constructing the outer shell of the multi-shelled GBD by transforming a unit cube in the RGB color coordinate system into a perceptual color space, and a second constructing step for constructing the inner shell of the multi-shelled GBD by transforming an irregularly-shaped inner cube in the RGB color coordinate system into the perceptual color space, wherein the irregularly-shaped inner cube in the RGB color coordinate system is defined by eight reference primaries that define vertices of the irregularly-shaped cube, and wherein one of the vertices of the irregularly-shaped inner cube from which the inner shell of the multi-shelled GBD is constructed corresponds to the additive RGB white.

9. An apparatus according to claim 8, wherein said first transforming step comprises application of the device model to the unit cube in the RGB color co-ordinate system and application of a transformation from the device independent coordinate system to the perceptual color coordinate system.

10. An apparatus according to claim 8, wherein said second transforming step comprises application of an interpolant that transforms a unit cube to the irregularly-shaped cube, application of the device model, and application of the transformation from the device independent coordinate system to the perceptual coordinate system.

11. An apparatus according to claim 8, wherein the additive RGB white value preserves a distinction between a bright white output of the device and a specular white output of the device.

12. An apparatus according to claim 11, wherein RGB color values for the additive RGB white value are calculated by measuring device output in the device independent color space for each of three independent full-on outputs of red, green and blue, measuring device output in the device independent coordinate space for a black output, calculating an additive XYZ white value in the device independent coordinate space by applying the following equations:

$X_{aw} = X_r + X_g + X_b - 2X_k$ $Y_{aw} = Y_r + Y_g + Y_b - 2Y_k$ $Z_{aw} = Z_r + Z_g + Z_b - 2Z_k$ and transforming the additive XYZ white value to the RGB color space by applying an inverse of the device model.

13. An apparatus according to claim 12, wherein some or all of the reference primaries are based on the additive RGB white value.

14. An apparatus according to claim 12, wherein some or all of the reference primaries are based on an average of the RGB color values of the additive RGB white value.

15. Computer-readable memory medium having computer-executable process steps stored thereon, wherein said process steps are executable by a computer so as to construct a multi-shelled gamut boundary descriptor (GBD) for an RGBW self-luminous display device which projects a white light W brighter than additive RGB white, wherein there is a device model for the self-luminous display device which defines a relationship between color values in a device dependent RGB color coordinate system and corresponding color values in a device independent color coordinate system, and wherein the multi-shelled GBD comprises at least an outer shell and an inner shell, wherein said process steps comprise:

a first constructing step to construct the outer shell of the multi-shelled GBD by transforming a unit cube in an RGB color coordinate system into a perceptual color space, and a second constructing step to construct the inner shell of the multi-shelled GBD by transforming an irregularly-shaped inner cube in the RGB color coordinate system into the perceptual color space, wherein the irregularly-shaped inner cube in the RGB color coordinate system is defined by eight reference primaries that define vertices of the irregularly-shaped cube, and wherein one of the vertices of the irregularly-shaped inner cube from which the inner shell of the multi-shelled GBD is constructed corresponds to the additive RGB white.

16. Computer-executable process steps stored on a computer-readable medium, wherein said process steps are executable by a computer so as to construct a multi-shelled gamut boundary descriptor (GBD) for an RGBW self-luminous display device which projects a white light W brighter than additive RGB white, wherein there is a device model for the self-luminous display device which defines a relationship between color values in a device dependent RGB color coordinate system and corresponding color values in a device independent color coordinate system, and wherein the multi-shelled GBD comprises at least an outer shell and an inner shell, wherein the process steps comprise:

code for constructing the outer shell of the multi-shelled GBD by transforming a unit cube in an RGB color coordinate system into a perceptual color space, and code for constructing the inner shell of the multi-shelled GBD by transforming an irregularly-shaped inner cube in the RGB color coordinate system into the perceptual color space, wherein the irregularly-shaped inner cube in the RGB color coordinate system is defined by eight reference primaries that define vertices of the irregularly-shaped cube, and wherein one of the vertices of the irregularly-shaped inner cube from which the inner shell of the multi-shelled GBD is constructed corresponds to the additive RGB white.

17. A color management module stored in memory of a computer, wherein the color management module is executable by the computer to transform a source device dependent coordinate system to a destination color value in a destination device dependent coordinate system, said color management module comprising:

a first transformation of the source color value to a source color value in a device independent color coordinate system using a device model;

a second transformation of the source color value in the device independent coordinate system to a source color value in a perceptual color coordinate system;

a gamut mapping so as to map the source value in the perceptual color coordinate system to a destination color value in the perceptual color coordinate system;

a third transformation of the destination color value in the perceptual color coordinate system to a destination color value in the device independent color coordinate system;

a fourth transformation of the destination color value in the device independent color coordinate system to the destination color value in the destination device dependent color coordinate system using an inverse of a device model;

wherein at least one device of said source and destination devices is comprised of an RGBW self-luminous projector; and wherein in said gamut mapping step, a multi-shelled gamut boundary descriptor (GBD) is applied for said one device, wherein the device model for said one device is comprised of a device model for the RGBW self-luminous projector which projects a white light W brighter than additive RGB white, and which defines a relationship between color values in a device dependent RGB color coordinate system and corresponding color values in the device independent color coordinate system, and wherein the multi-shelled GBD comprises at least an inner shell and an outer shell and is constructed by constructing the outer shell of the multi-shelled GBD by transforming a unit cube in the RGB color coordinate system into a perceptual color space, and constructing the inner shell of the multi-shelled GBD by transforming an irregularly-shaped inner cube in the RGB color coordinate system into the perceptual color space, wherein the irregularly-shaped inner cube in the RGB color coordinate system is defined by eight reference primaries that define vertices of the irregularly-shaped cube, and wherein one of the vertices of the irregularly-shaped inner cube from which the multi-shelled GBD is constructed corresponds to the additive RGB white.

* * * * *